3,166,561
1-[2-(1,4-BENZODIOXANYL)-METHYL]-4-PHENYL-4-CARBONYLAMINO OR 4-CARBALKOXY AMINO PIPERIDINES
Paul Adriaan Jan Janssen, Vosselaar, near Turnhout, Belgium, assignor to Research Laboratorium Dr. C. Janssen N.V., a corporation of Belgium
No Drawing. Filed Aug. 20, 1962, Ser. No. 218,119
11 Claims. (Cl. 260—294)

This invention relates to a new series of organic compounds. More particularly, it concerns certain 1-[2-($R_1$-1,4-benzodioxanyl)-methyl]-4-$R_2$-4-phenyl-piperidines, and their therapeutically active, non-toxic acid addition salts.

In the above generic definition, $R_1$ stands for hydrogen, resulting in an unsubstituted 1,4-benzodioxanyl ring (except for the methyl link) or for fluoro. $R_2$ represents the group $(CH_2)_nNHCOR_3$ where $n$ is the positive integer zero or one, and $R_3$ is lower alkoxy, lower alkyl, phenyl, cyclopropyl, benzyl, or tri-lower alkoxy phenyl. Lower alkoxy and lower alkyl groups are those from 1 to 7 carbon atoms, for example, methyl, methoxy, ethyl, ethoxy, propyl, propoxy, and so one.

The compounds of this invention may be converted to their therapeutically useful acid addition salts by reaction with an appropriate acid as, for example, an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, picric, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxy-benzoic or 2-acetoxy-benzoic acid.

The novel compounds are prepared by reacting a 2-halomethyl-1,4-benzodioxane or corresponding 2-substituted methyl esters of strong mineral acids, including tolylsulfonic acid, with a 4-phenyl-piperidine, further appropriately substituted in the 4-position by the abovementioned $(CH_2)_nNHCOR_3$ group, under basic conditions. The halogenated methyl substituent on the 1,4-benzodioxanyl ring may be chloromethyl or, preferably, bromomethyl.

Further, the novel compounds may be prepared by reacting the 2-halomethyl-1,4-benzodioxane with di-(2-hydroxyethyl)-amine to give the 2-[di-(2-hydroxyethyl)-amino]methyl-1,4-benzodioxane. This compound is then reacted with a mixed anhydride of strong inorganic acids such as thionyl chloride, or the bromide; phosphorous oxychloride or phosphorous trichloride, to give the halogenated form. This is then reacted with benzylcyanide, in the presence of at least two equivalents of a strong basic condensing agent, to give 1-[2-(1,4-benzodioxanyl)-methyl]-4-phenyl-4-cyano-piperidine.

Alternatively, the 2-esterified methyl-1,4-benzodioxane may be first reacted with a 4-phenyl-4-cyano-piperidine to give the corresponding 1-[2-(1,4-benxodioxanyl)-methyl] derivative, which is then reduced to give the corresponding 1-[2-(1,4-benzodioxanyl) methyl]-4-(amino-methyl)-phenyl-piperidine, which is then acylated, yielding the desired 4-acylamino-piperidine.

Depending upon the conditions employed during the course of the reaction, the novel compounds are obtained either in the form of the free bases or salts thereof. The salts are converted to the free bases in the usual manner, for example by reaction with alkali such as sodium or potassium hydroxide. The bases can be converted to their therapeutically useful acid addition salts by reaction with an appropriate organic or inorganic acid, as indicated above.

The novel compounds may be converted to the corresponding quaternary ammonium compounds by reaction of the tertiary bases with an ester formed by a hydroxylated lower hydrocarbon compound with a strong inorganic or organic acid. Hydroxylated lower hydrocarbon compounds contain from 1 to 7 carbon atoms and the esters thereof are, more especially, those with mineral acids, such as hydrochloric, hydrobromic, hydriodic or sulfuric acid. Specific examples of such esters are lower alkyl halides—methyl iodide, ethyl bromide, propyl chloride; lower alkenyl halides—allybromide; diower alkyl sulfates—dimethyl sulfate, diethyl sulfate; lower alkyl aryl sulfonates—methyl p-toluolsulfonate or aralkyl halides—benzyl chloride. The quaternizing reaction may be performed in the presence or absence of a solvent, at room temperature or under cooling, at atmospheric pressure or in a closed vessel under pressure. Suitable solvents for this purpose are lower alkanols, such as ethanol, propanol or butanol; or organic acid amides such as formamide or dimethyl formamide. When lower alkyl halogenides are used as quaternizing agents, formamide and dimethyl formamide are the preferred solvents and the reaction is advantageously run in a closed vessel under pressure, the latter being built up by heating.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by reacting the quaternary salts with an anion exchanger or by electrodialysis. Quaternary ammonium salts may be prepared from the resulting base by reaction with acids such as those mentioned hereinabove for the preparation of the acid addition salts or, if desired, with a mono-lower alkyl sulfate such as methyl sulfate or ethyl sulfate. The quaternary ammonium compound may also be converted into another quaternary salt directly without conversion to the quaternary ammonium hydroxide. Thus, a quaternary ammonium iodide may be reacted with freshly prepared silver chloride to yield the quaternary ammonium chloride, or the quaternary ammonium iodide may be converted to the corresponding chloride by treatment with hydrochloric acid in anhydrous methanol.

The condensation of the halogenated 1,4-benzodioxane with the 4-di-substituted tertiary amine is conducted in the presence of an alkali metal carbonate or bicarbonate, preferably in an inert organic solvent medium such as a lower alkanol, for example, methanol, ethanol, propanol, or n-butanol or a ketone such as 4-methyl-2-pentanone.

Acylation of the 4-primary amino group on the piperidine ring is carried out only under the condition where the 1-nitrogen position is protected, i.e. the 2-(1,4-benzodioxanyl)-methyl moiety has been previously introduced. As acylating agents are employed acid anhydrides or, preferably, acid chlorides of compounds bearing groups corresponding to the $R_3$ functions defined hereinabove. For example, reaction with acetyl chloride will give the 4-acetylamino-methyl derivative; reaction with cyclopropane carboxylic acid chloride will give the 4-(cyclopropylcarbanyl)-amino-methyl derivative, and so on. The reaction is carried out in the presence of a suitable organic solvent, preferably a halogenated hydrocarbon, such as chloroform, carbon tetrachloride or chlorobenzene; an ether such as diethylether or dioxane; or benzene, toluene, xylene, hexane, heptane or tetrahydrofuran.

The reduction may be carried out with a variety of reducing agents, for example catalytically activated hydrogen, e.g. hydrogen activated by a platinum, palladium or nickel catalyst such as platinum oxide or Raney nickel; hydrogen in statu nascendi, that is a reduction with metals and acids, e.g. iron, zinc or tin, such as zinc and acetic acid; with alkali metals and alcohols, e.g. sodium and ethanol or butanol; with sodium and moist ether; with sodium or aluminum amalgam and the appropriate solvent, or with di-light metal hydrides such as lithium aluminum hydride, sodium aluminum hydride, magnesium hydride in the presence of a catalyst such as $AlCl_3$.

The novel compounds are hypotensive agents. For example, at a dose level of about 2.5 mg. per kilo subcutaneously the compounds produce a direct mean blood pressure in laboratory test animals (rats) which is substantially lower than that observed in control animals.

The nomenclature used in this specification, appended examples, and claims, is based on the following nucleus:

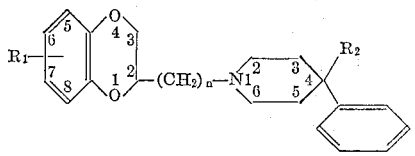

The following examples are intended to illustrate, but not to limit, the scope of the present invention.

Example I

To a stirred mixture of 6.4 parts 2-bromo-methyl-1,4-benzodioxane, 6.4 parts sodium carbonate, a few crystals of potassium iodide and 100 parts 4-methyl-2-pentanone is added dropwise a solution of 5.2 parts 4-[(N-ethoxycarbonyl) - amino-methyl]-4-phenyl-piperidine (isolated from its hydrochloride) in 100 parts 4-methyl-2-pentanone. After the addition is complete, the whole is stirred and refluxed for 65 hours. After cooling the reaction mixture, 75 parts water are added. The organic layer is separated, dried over $K_2CO_3$ and evaporated. The dark oily residue is treated with 800 parts ether. The ether is decanted from some unsoluble matter and HCl gas is introduced into the solution. The precipitated dark semi-solid hydrochloride is filtered off, boiled with activated charcoal in 300 parts water and filtered. The filtrate is cooled, alkalized and extracted with 400 parts ether. The organic layer is dried and evaporated. The oily residue is treated with 240 parts diisopropylether. After filtration from unsoluble matter, the solution is diluted to a volume of 500 parts and HCl gas is introduced into it. The precipitated hydrochloride is filtered off (very hygroscopic) and dried to yield dl-1-[2-(1,4-benzodioxanyl) - methyl] - 4 - [2 - (N-ethoxycarbonyl)-amino-methyl]-4-phenyl-piperidine hydrochloride; melting point 116–147° C. (dec.).

Example II

From 4.1 parts dl-4-(amino-methyl)-1-[2-(1,4-benzodioxanyl) - methyl]-4-phenyl-piperidine dihydrochloride, the free base is liberated in the usual manner and extracted with chloroform. The organic layer is separated, dried and evaporated. The residue is dissolved in 128 parts anhydrous chloroform. This solution is cooled to 5° C. and there is added dropwise a solution of 1.6 parts acetylchloride in 7 parts anhydrous chloroform (exothermic reaction). The reaction mixture is stirred overnight at room temperature and then alkalized with about 25 parts sodium hydroxide 20% at a temperature of <20° C. The aqueous layer is separated and extracted twice with chloroform. The combined organic layers are washed with water, dried over magnesium sulfate, filtered and evaporated. The oily residue is dissolved in a mixture of 40 parts acetone and 20 parts diisopropylether and evaporated again. The solid residue is triturated in diisopropylether, yielding dl - 4 - (N-acetyl-aminomethyl) - 1 - [2 - (1,4 - benzodioxanyl) - methyl] - 4-phenyl-piperidine; melting point 140–141.1° C.; as a white microcrystalline powder.

Example III

From 8.2 parts dl-4-(amino-methyl)-1-[2-(1,4-benzodioxanyl) - methyl] - 4 - phenyl - piperidine dihydrochloride, the free base is liberated in the usual manner and extracted with 150 parts chloroform. The organic layer is separated, dried over magnesium sulfate and filtered while hot. After cooling the filtrate there is added dropwise a solution of 3.8 parts propionic acid chloride in 45 parts chloroform at a temperature below 5° C. (exothermic reaction). The reaction mixture is stirred for 50 hours at room temperature, filtered and the filtrate is alkalized with sodium hydroxide 20% at a temperature of 20° C. The aqueous layer is separated and extracted once more with chloroform. The combined organic layers are washed with water, dried over magnesium sulfate, filtered and evaporated. The oily residue is dissolved in a mixture of 80 parts acetone and 160 parts diisopropylether. The whole is filtered and then gaseous hydrogen chloride is introduced into the filtrate: a semi-solid hydrochloride is obtained. The solvent is decanted and evaporated. The whole (residue and semi-solid hydrochloride) is triturated in a mixture of 80 parts acetone and 8 parts 2-propanol, to yield dl-1-[2-(1,4 - benzodioxanyl) - methyl] - 4 - phenyl - 4 - (N-propionyl-amino-methyl)-piperidine hydrochloride; melting point 205.6–207° C. (dec.); as a white granular powder.

Example IV

From 8.2 parts of dl-4-(amino-methyl)-1-[2-(1,4-benzodioxanyl)-methyl]-4-phenyl-piperidine dihydrochloride, the free base is liberated in the usual manner. After extraction with ether, the organic layer is dried and evaporated. The residue is dissolved in 180 parts anhydrous chloroform. To this solution is added dropwise a solution of 4.3 parts butyroylchloride in 15 parts anhydrous chloroform (exothermic reaction). The whole is stirred overnight at room temperature. Then the reaction mixture is alkalized with sodium hydroxide 20%, washed a few times with diluted sodium hydroxide-solution and finally once with water. The organic layer is separated, dried over magnesium sulfate, filtered and evaporated. The residue is dissolved in a mixture of 80 parts acetone and 160 parts diisopropylether. The whole is filtered and gaseous hydrogen chloride is introduced into the filtrate: a semi-solid hydrochloride is obtained. The solvent is decanted and the residue is triturated in diisopropylether, yielding crude dl-1-[2-(1,4-benzodioxanyl)-methyl]-4-(N-butyroyl-amino-methyl)-4-prenyl-piperidine hydrochloride. The combined organic filtrates (acetone and diisopropylether) are evaporated. The residue is recrystallized from a mixture of 4 parts acetone and 8 parts diisopropylether, yielding dl-1-[2-(1,4-benzodioxanyl)-methyl] - 4 - (N - butyroyl - amino - methyl)-4-phenyl-piperidine hydrochloride; melting point 174–181° C. The first crop of product is recrystallized from 80 parts boiling 4-methyl-2-pentanone, yielding a second fraction of dl - 1 - [2 - (1,4 - benzodioxanyl) - methyl] - 4 - (N-butyroyl-amino-methyl)-4-phenyl-piperidine hydrochloride; melting point 178–181.1° C.; as a white microcrystalline powder.

Example V

From 8.2 parts dl-4-(amino-methyl)-1-[2-(1,4-benzodioxanyl)-methyl]-4-phenyl-piperidine dihydrochloride, the free base is liberated in the usual manner and extracted with ether. The organic layer is dried and evaporated. The residue (free base) is dissolved in 180 parts anhydrous chloroform. To this solution is added dropwise a solution of 4.2 parts cyclopropane carboxylic acid chloride in 15 parts anhydrous chloroform at room temperature (exothermic reaction). After stirring overnight at room temperature, the reaction mixture is alkalized with 30 parts sodium hydroxide 20%. The whole is washed twice with sodium hydroxide 5% and once with water. The organic layer is dried over magnesium sulfate, filtered and evaporated. The oily residue is dissolved in a mixture of 120 parts acetone and 240 parts diisopropylether. This solution is filtered and gaseous hydrogen chloride is introduced into the filtrate: a semi-solid hydrochloride is obtained. The solvent is decanted and evaporated. The whole (residue and semi-solid hydrochloride) is triturated in 80 parts boiling 4-methyl - 2 - pentanone, yielding dl - 1 - [2 - (1,4-benzodioxanyl) - methyl] - 4 - [N - (cyclopropyl - carbonyl)-amino-methyl]-4-phenyl-piperidine hydrochloride; melting point 216–217.4° C.; as a white granular powder.

Example VI

From 12.3 parts dl-4-(amino-methyl)-1-[2-(1,4-benzodioxanyl)-methyl]-4-phenyl-piperidine dihydrochloride, the free base is liberated in the usual manner and extracted with ether. The organic layer is dried and evaporated. The residue (free base) is dissolved in 225 parts anhydrous chloroform. This solution is cooled to a temperature of about 5° C. (ice bath) and then there is added dropwise a solution of 8.5 parts benzoyl chloride in 22.5 parts anhydrous chloroform (exothermic reaction). After the addition is complete, the ice-bath is removed and the whole is stirred for 20 hours at room temperature. The reaction mixture is alkalized with sodium hydroxide 20% at a temperature of 10° C. The aqueous layer is extracted twice with chloroform. The combined organic layers are dried over magnesium sulfate and evaporated. The residue is dissolved in 40 parts acetone. After addition of 400 parts diisopropylether, gaseous hydrogen chloride is introduced into the solution. The precipitated hydrochloride is filtered off, yielding crude dl-1-[2-(1,4-benzodioxanyl) - methyl] - 4 - (N - benzoyl - amino-methyl)-4-phenyl-piperidine hydrochloride. This crop is boiled in 80 parts 4-methyl-2-pentanone. After cooling overnight at —20° C., dl-1-[2-(1,4-benzodioxanyl)-methyl] - 4 - (N - benzoyl - amino - methyl) - 4 - phenyl-piperidine hydrochloride is filtered off; melting point 133–152° C. (dec.); as a pale-yellow, amorphous powder.

Example VII

To a solution of 7.5 parts dl-4-(amino-methyl)-1-[2-(1,4-benzodioxanyl)-methyl]-4-phenyl-piperidine, in 150 parts anhydrous chloroform is added dropwise a solution of 5.8 parts 2-phenyl-acetylchloride in 15 parts anhydrous chloroform. After the addition is complete, the whole is stirred overnight at room temperature. The reaction mixture is alkalized with 30 parts sodium hydroxide 20%. The organic layer is separated, washed twice with diluted sodium hydroxide solution and once with water. Then it is dried over magnesium sulfate, filtered and evaporated. The residue is dissolved in a mixture of 160 parts acetone and 320 parts diisopropylether, filtered and gaseous hydrogen chloride is introduced into the filtrate. The semi-solid hydrochloride solidifies on standing for a few hours at room temperature. The precipitate is filtered off, boiled in 120 parts 4-methyl-2-pentanone, filtered again and dried, yielding 8 parts product. This crop is dissolved in a boiling mixture of 80 parts 2-propanol and 17 parts water. The whole is filtered and after cooling the filtrate overnight at 0° C., dl-1-[2-(1,4-benzodioxanyl) - methyl] - 4 - phenyl-4-[N-(2-phenyl-acetyl)-amino-methyl]-piperidine hydrochloride is filtered off; melting point 248–250° C.; as a white crystalline powder.

On further cooling the mother liquor for 6 hours to —20° C., a second fraction of dl-1-[2-(1,4-benzodioxanyl) - methyl]-4-phenyl-4-[N-(2-phenyl-acetyl)-amino-methyl]-piperidine hydrochloride is obtained; melting point 245–246.4° C.; as a white amorphous powder.

Example VIII

From 8.2 parts dl-4-(amino-methyl)-1-[2-(1,4-benzodioxanyl) - methyl]-4-phenyl-piperidine dihydrochloride, the free base is liberated in the usual manner and extracted with chloroform. The organic layer is dried and evaporated. The residue (free base) is dissolved in 234 parts anhydrous chloroform. Then there are added 4.8 parts pentanoic acid chloride. The whole is stirred overnight at room temperature. The reaction mixture is alkalized with 30 parts sodium hydroxide 20%. The organic layer is separated, dried over potassium carbonate, filtered and evaporated. The oily residue is dissolved in ether, filtered and gaseous hydrogen chloride is introduced into the filtrate. The precipitated hydrochloride is filtered off and dried, yielding crude dl-1-[2-(1,4-benzodioxanyl) - methyl] - 4 - phenyl-4-(N-pentanoyl-amino-methyl)-piperidine hydrochloride. This crop is recrystallized from 48 parts 4-methyl-2-pentanone. After keeping for 2 days at room temperature, dl-1-[2-(1,4-benzodioxanyl) - methyl] - 4 - phenyl-4-(N-pentanoyl-amino-methyl)-piperidine hydrochloride is filtered off; melting point 124.6–127.6° C.; as a white amorphous powder.

Example IX

To a solution of 7.5 parts dl-4-(amino-methyl)-1-[2-(1,4-benzodioxanyl)-methyl]-4-phenyl-piperidine in 150 parts anhydrous chloroform is added dropwise a solution of 9.3 parts 3,4,5-trimethoxy-benzoyl-chloride in 30 parts anhydrous chloroform (slightly exothermic reaction). After the addition is complete, the whole is stirred for 20 hours at room temperature. The reaction mixture is alkalized with 20% sodium hydroxide. The organic layer is separated, washed successively three times with a 5%-sodium-hydroxide-solution and once with water. Then it is dried over magnesium sulfate, filtered and evaporated. The residue is dissolved in a mixture of 120 parts acetone and 240 parts diisopropylether, filtered and gaseous hydrogen chloride is introduced into the solution: a sticky hydrochloride is obtained. The solvent is decanted and evaporated. This residue, together with the sticky hydrochloride is dissolved in 150 parts 4-methyl-2-pentanone: an oil is obtained. The solvent is decanted and the oily residue solidifies in acetone, yielding dl - 1-[2-(1,4-benzodioxanyl)-methyl]-4-phenyl-4 - [N-(3,4,5-trimethoxy-benzoyl)-amino-methyl]-piperidine hydrochloride hydrate; melting point 153–157° C. (dec.); as a white amorphous powder.

After keeping the mother liquor overnigt at room temperature, a second fraction of dl-1-[2-(1,4-benzodioxanyl) - methyl] - 4-phenyl-4-[N-(3,4,5-trimethoxy-benzoyl)-amino-methyl]-piperidine hydrochloride hydrate is obtained; melting point 134.2–154° C. (dec).

Example X

From 4.8 parts 4-[N-(methoxy-carbonyl)-amino]-4-phenyl-piperidine hydrobromide, the free base is liberated as follows: 4.8 parts 4-[N-(methoxy-carbonyl)-amino]-4-phenyl-piperidine hydrobromide are dissolved in water. This aqueous solution is alkalized with sodium hydroxide 44% and extracted with chloroform. The organic layer is separated, dried over magnesium sulfate, filtered and evaporated. This residue (free base of 4-[N-(methoxy-carbonyl)-amino]-4-phenyl - piperidine hydrobromide), together with 4 parts 2 - (bromo - methyl) - 1,4 - benzodioxane, 2.5 parts sodium carbonate, a few crystals of potassium iodide in 200 parts 4-methyl-2-pentanone is stirred and refluxed for 65 hours. After cooling, 75 parts water are added. The aqueous layer is separated and extracted once more with 80 parts ether. The combined organic layers are dried over potassium carbonate, filtered and evaporated. The oily residue is dissolved in a mixture of 40 parts acetone and 280 parts ether. The whole is filtered and then gaseous hydrogen chloride is introduced into the filtrate: a sticky hydrochloride is obtained. The solvent is decanted and the oily residue is triturated in a boiling mixture of 8 parts acetone and 32 parts 4-methyl-2-pentanone. A solid is obtained. Then another 32 parts acetone are added and the whole is boiled for 5 minutes. After cooling to room temperature, crude dl-1-[2-(1,4-benzodioxanyl)-methyl]-4-[N-(methoxy-carbonyl)-amino]-4-phenyl-piperidine hydrochloride is obtained. This crop is recrystallized from a mixture of 24 parts acetone, 24 parts 2-propanol and 6 parts water. After cooling to −20° C., dl-1-[2-(1,4-benzodioxanyl) - methyl] - 4 - [N-(methoxy-carbonyl)-amino]-4-phenyl-piperidine hydrochloride is filtered off; melting point 246–247° C. (dec.); as a white granular powder.

*Example XI*

To a stirred mixture of 2.6 parts 4-(N-acetylaminomethyl)-4-phenyl-piperidine, 2.2 parts sodium carbonate, a few crystals of potassium iodide in 160 parts 4-methyl-2-pentanone is added dropwise a solution of 3 parts 2-(bromo-methyl) 7-fluoro-1,4-benzodioxane in 40 parts 4-methyl-2-pentanone. After the addition is complete, the whole is stirred and refluxed for 60 hours. After cooling, 30 parts water are added. The organic layer is separated, dried over potassium carbonate, filtered and evaporated. The oily residue is dissolved in a mixture of 80 parts acetone and 160 parts diisopropylether. The whole is filtered and gaseous hydrogen chloride is introduced into the filtrate: a solid hydrochloride is obtained. The crude salt is then dissolved in water and the free free base is liberated again by alkalinization of this solution. After extraction with ether, the etheric solution is dried over potassium carbonate, filtered and the filtrate is evaporated. The oily residue solidifies on treating in a mixture of 40 parts acetone and 40 parts diisopropylether, yielding impure dl-4-(N-acetyl-amino-methyl)-1-[2-(7-fluoro - 1,4 - benzodioxanyl)-methyl]-4-phenyl piperidine. On keeping the filtrate overnight at room temperature, a second fraction of impure dl-4-(N-acetyl-amino-methyl) - 1 - [2-(7-fluoro - 1,4 - benzodioxanyl)-methyl]-4-phenyl-piperidine is obtained. The combined fractions are recrystallized from a mixture of 8 parts acetone and 8 parts diisopropylether, to yield dl-4-(N-acetyl-amino-methyl)-1-[2-(7-fluoro - 1,4 - benzodioxanyl)-methyl] - 4 - phenyl-piperidine; melting point 119–122.2° C.; as a pale-brown, amorphous powder.

*Example XII*

A mixture of 95 parts 2-bromo-methyl-1,4-benzodioxane, 74.5 parts 4-cyano-4-phenyl-piperidine, 55 parts sodium carbonate, a few crystals of potassium iodide in 1000 parts 4-methyl-2-pentanone is stirred and refluxed for 2 days. After cooling, 400 parts water are added. The organic layer is separated, dried and evaporated. The residue is washed with diisopropylether and filtered off, yielding dl-1-[2-(1,4-benzodioxanyl)-methyl]-4-cyano-4-phenyl-piperidine; melting point 92–93.2° C.

On further keeping the filtrate at room temperature, a second fraction of dl-1-[2-(1,4-benzodioxanyl)-methyl]-4-cyano-4-phenyl-piperidine is obtained; melting, point 89–90° C.; as white crystals.

*Example XIII*

To a solution of 11.5 parts lithium aluminum hydride in 100 parts tetrahydrofurane is added dropwise a solution of 94 parts dl-1-[2-(1,4-benzodioxanyl)-methyl]-4-cyano-4-phenyl-piperidine in 240 parts tetrahydrofurane, at a temperature of about 45° C. After the addition is complete, the reaction mixture is stirred first at the same temperature for 3 hours and 30 minutes and then refluxed for 1 hour. The whole is decomposed by successive addition of 12 parts water, 9 parts sodium hydroxide 20% and 50 parts water. The mixture is filtered from inorganic matter. The filter-cake is washed with tetrahydrofurane and the combined filtrates are evaporated. The oily residue is dissolved in 240 parts 2-propanol and to this solution are added about 60 parts concentrated hydrochloric acid. After keeping at room temperature, the precipitated salt is filtered off, washed with 2-propanol and dried, yielding dl-4-(amino-methyl)-1-[2-(1,4-benzodioxanyl)-methyl]-4-phenyl-piperidine dihydrochloride; melting point 272–278° C.; as a white amorphous powder.

What is claimed is:

1. A member selected from the group consisting of 1-[2-($R_1$-1,4-benzodioxanyl)-methyl] - 4 - $R_2$-4-phenyl-piperidine and the non-toxic acid addition salts thereof, wherein $R_1$ is a member of the group consisting of hydrogen and fluoro, and $R_2$ stands for $(CH_2)_n NHCOR_3$ where $n$ is a postitive integer from zero to one and $R_3$ is a member of the group consisting of lower alkyl, lower alkoxy, phenyl, cyclopropyl, benzyl and tri-lower alkoxy phenyl.

2. 1-[2-(1,4-benzodioxanyl)-methyl] - 4 - (N-lower alkyl carbonyl amino methyl)-4-phenyl-piperidine.

3. 1-[2-(1,4-benzodioxanyl)-methyl] - 4 - (N-acetyl-amino-methyl)-4-phenyl-piperidine.

4. 1-[2-(1,4-benzodioxanyl)-methyl] - 4 - (N-propionyl amino methyl)-4-phenyl-piperidine.

5. 1-[2-(1,4-benzodioxanyl)-methyl] - 4 - (N-propionyl amino methyl)-4-phenyl-piperidine hydrochloride.

6. 1-[2-(1,4-benzodioxanyl)-methyl] - 4 - (N-butyroyl amino methyl)-4-phenyl-piperidine.

7. 1[2-(1,4-benzodioxanyl)-methyl] - 4 - (N-butyroyl amino methyl)-4-phenyl-piperidine hydrochloride.

8. 1-[2-(1,4-benzodioxanyl)-methyl] - 4 - [N-(cyclopropyl-carbonyl)-amino methyl]-4-phenyl-piperidine.

9. 1-[2-(1,4-benzodioxanyl)-methyl] - 4 - [N-(cyclopropyl-carbonyl)-amino methyl]-4-phenyl-piperidine hydrochloride.

10. 1-[2-(1,4-benzodioxanyl)-methyl] - 4 - (N-pentanoyl amino methyl)-4-phenyl-piperidine.

11. 1-[2-(1,4-benzodioxanyl)-methyl] - 4 - (N-pentanoyl amino methyl)-4-phenyl-piperidine hydrochloride.

No references cited.